United States Patent Office 3,476,682
Patented Nov. 4, 1969

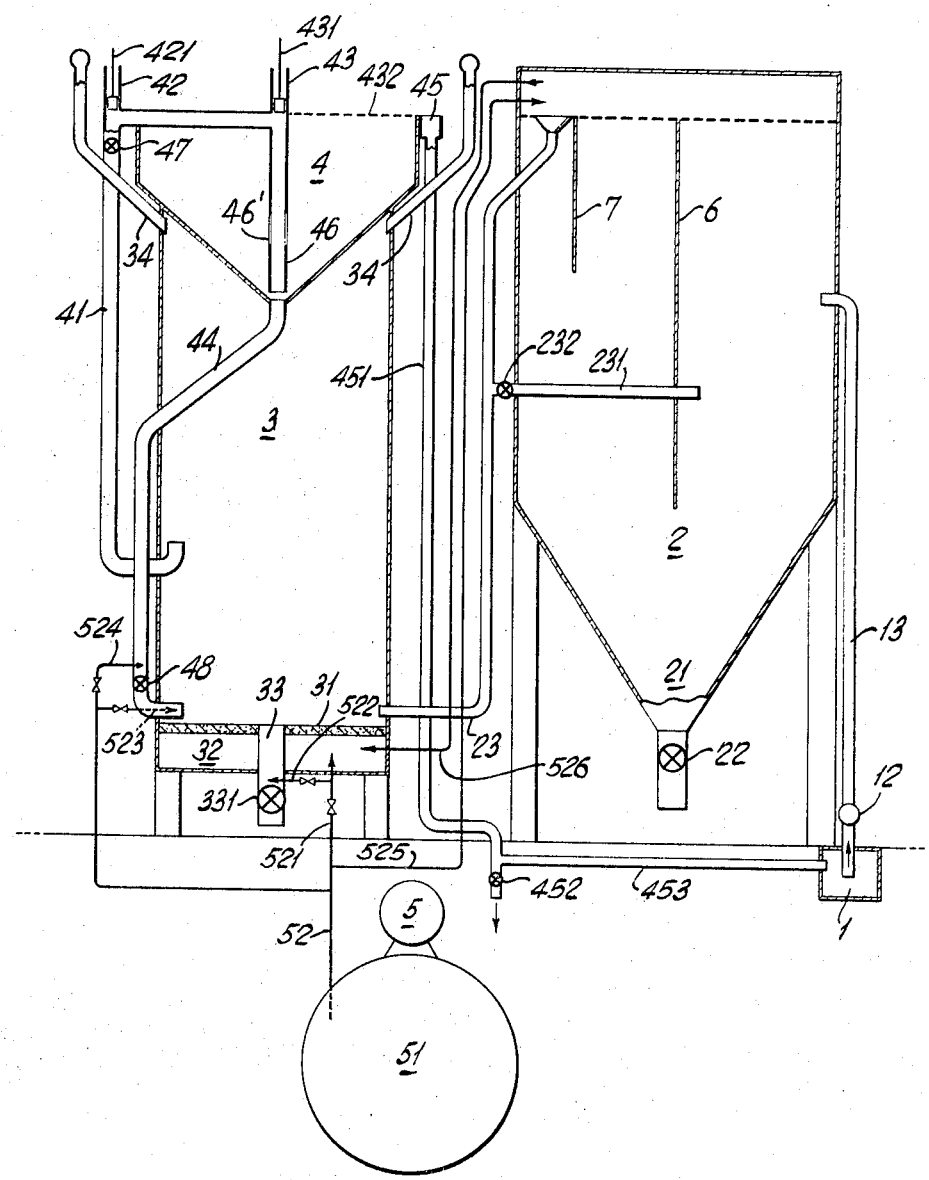

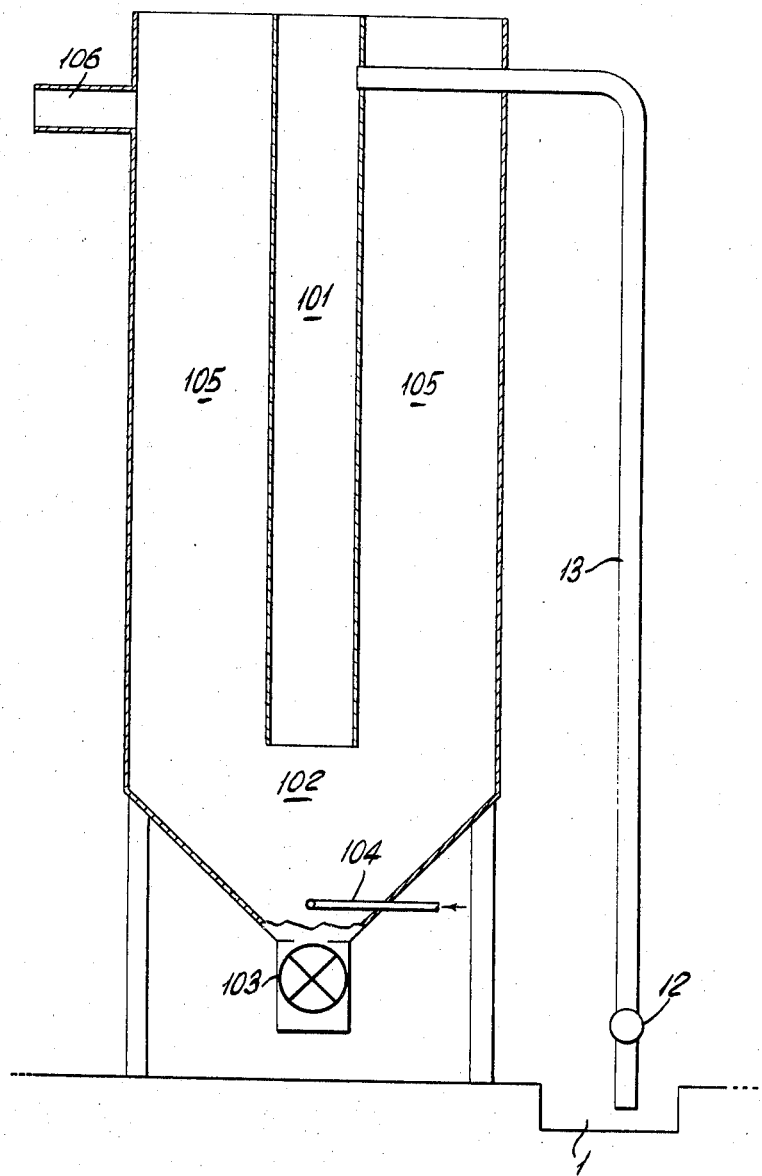

3,476,682
METHOD AND APPARATUS FOR THE PURIFICATION OF SEWAGE
Walter Albersmeyer, Gummersbach, Germany, assignor to Wibau Westdeutsche Industrie- und Strassenbau-Maschinen-Gesellschaft m.b.H., Gelnhausen, Hesse, Germany
Filed May 8, 1967, Ser. No. 636,711
Claims priority, application Germany, May 9, 1966, W 41,529
Int. Cl. C02c 1/06
U.S. Cl. 210—7
13 Claims

ABSTRACT OF THE DISCLOSURE

Method and apparatus for the purification of sewage by a combined mechanical biological process operated with hydrostatic pressure flows and with partial recycling during the biological purification.

---

The present invention relates to a method and apparatus for the mechanical biological purification of sewage, and in particular relates to such purification using one or more columnar reaction towers.

Apparatus for the mechanical purification of sewage is known in the form of rakes, sand traps and settling basins with and without a septic zone. Likewise equipment for bioligical purification is known in the form of percolating filters, activated sludge systems, immersion bodies, and oxidation pits.

Percolating filters are tanks which are filled with a filler, usually lava slag or coke. On their surface sewage is uniformly distributed by means of a rotating sprinkler, the sewage being purified on its way through the filter by the biological decomposing material forming on the filler by decomposition of the ingredients.

Immersion bodies consist of many thin disks mounted closely together side by side on a shaft with little space between them, the biological decomposing material forming on the disks. These rotating disks dip into a tank containing sewage to be purified. The contact of the decomposing material covered disks with the sewage brings about the purification thereof.

Activated sludge systems are usually rectangular basins in which by constant sludge concentration and aeration with paddle wheels, filter candles, perforated pipes, or surface aerators the supply of air is effected. The control of the sludge concentration is maintained by sludge withdrawal or respectively re-supply. The sewage purification occurs by the microbe-covered flakes of the activated sludge.

In oxidation pits, which constitute a simplified activated sludge process, the sewage is circulated in circular or oval paths, depending on the shape of the pit. The movement of the sewage in the pit is brought about by so-called aeration rollers, which at the same time take care of optimum introduction of oxygen. The purification of the sewage occurs by oxidation and biological decomposition.

To obtain satisfactory sewage purification, the biological methods are indispensable, as most sewage ingredients dissolved in water can be economically removed only by biological decomposition. Apart from some variations, the biological purification as practiced to date is based in general on two methods:
(A) The percolating filter method.
(B) The activated sludge method.

Both of these methods have substantial disadvantages, which are mentioned below.

The purification of sewage on percolating filters requires the maintaining of a minimum inflow quantity. If this falls below this minimum, the result is a functional breakdown with complete failure of the decomposition output. On the other hand, if the percolating filter is overloaded, clogging occurs, the air supply is stopped and the filter becomes obstructed. As a percolating filter also must decompose the organic components of that portion of the biological turf which is dying due to age, an additional decomposition output is required, over and above that required for the sewage to be purified. The air supply in percolating filters for optimum decomposition output is in most cases insufficient. Since biological purification methods are predominantly aerobic processes, often more oxygen is needed in the percolating filter than is available since the available amount of oxygen is subject to considerable fluctuations with the time of day due to changing temperature and air pressure influences. These fluctuations have an effect on the particular decomposition output. Percolating filters also are sensitive to sudden temperature drops. At temperatures below the freezing point there is danger of icing over, with all its attendant problems.

Clogged or non-working percolating filters can be cleaned only by rinsing with hypochlorite lye. The expenditure for labor is very costly and the percolating filter is out of order for a long time.

The purification of sewage by means of the activated sludge process requires a relatively high expenditure for energy, which is consumed for artificial supply of air and for optimum motion in the activation tank. The utilization of the air is low in proportion to the required expenditure for energy. Also the space requirement and the expenditure for equipment are large due to the large structural capacity required per unit of output, as relatively long residence times are necessary.

It is therefore an object of the present invention to provide apparatus and method for purification of sewage by a combined mechanical biological purification process which overcomes the disadvantages reviewed above.

The method according to the invention provides that all steps which are necessary for the performance of the method occur in an interconnected continuous installation or plant and the flows and/or sludge cycles needed for the execution of the method are obtained in the total plant without additional aids, simply by hydrostatic pressure differences with eventual removal of only the purified water.

The invention will be further explained with reference to FIGS. 1 and 2 wherein:

FIG. 1 is a diagrammatic illustration of the apparatus of the present invention; and FIG. 2 is a diagrammatic illustration of another embodiment of that part of the apparatus illustrated on the right side of FIG. 1.

In the operation of the total plant, the untreated sewage is first pumped by a water pump 12 through water line 13 from the sump pump 1 into the enclosed tower 2 designed as a settling basin with a septic basin. In the tower 2 the first mechanical purification takes place. Sand and settling substances are separated from the sewage. The organic, putrefiable substances are putrified out in the septic basin 21 and can be removed from the plant via the stop valve 22 or a corresponding shut-off device.

The sewage separated from sludge and settling substances flows due to a hydrostatic excess pressure through the pipeline 23 to the biological purification tower 3. The reaction zone of the purification tower 3 may be partly or wholly filled with lava slag or other fillers of various kinds, or it may be free from fillers.

Spaced from the bottom of the biological reaction zone and parallel to it is a wholly or partly porous plate, which may be, for example, a sintered plastic plate 31.

This plate separates the water-filled reaction zone of tower 3 from an air zone 32. Via the air zone 32 there occurs due to excess pressure and pressing through of the air through the porous plate 31 a uniform aeration in fine bubbles partly or wholly over the cross-section area of the aeration zone. Alternatively this aeration may occur from below through filter candles, nozzles and/or in coarse bubbles, for example via the sludge outlet pipe 33.

In the upper part of the purification tower 3 there is provided a preferably funnel-shaped basin 4 of enlarged diameter which communicates with the reaction tower 3 through one or more pipelines 41, 44. These connecting line or lines may be provided with deaeration connections 42, 43 and floats 421, 431. Line 44 serves for the constant continuous sludge return from the sludge separating tank 4 into the aeration zone 3. To attain this effect, it does not matter whether the sludge separating tank 4 is provided above or next to the aeration zone 3.

The return of the activated sludge washed into the sludge separating tank 4 (via pipeline 41) can be substantially improved by insertion of a pipe connection 46 having slits 46'. As this pipe connection extends to just above the bottom of the basin 4, it becomes possible to draw sludge simultaneously from different levels of the sludge separating tank 4. To stabilize the cycle, the introduction of one or more perforated plates or registers at 432 has, besides the floats 421 and 431, proved successful.

For the regulation of the flow velocity in the lines 41 and 44 there are provided controllable shut-off devices 47 and 48.

Instead of at 33, a coarse-bubble aeration can occur, via 523 into the pipe connection 44. With the shut-off device 48 closed, the air can be blown counter to the sludge stream in the line 44 via line 524 into the sludge separating tank 4 whereby an aeration of the sludge separating tank 4 becomes possible. This aeration may become necessary for two reasons:

(1) For the separation of the inactive, old sludge from the active sludge of lesser age by brief aeration with subsequent separation of the old sludge at the surface of the sludge separating tank 4.

(2) For the aeration of the activated sludge which during possible repair in the reaction zone 3 can be conveyed by excess pressure into the sludge separating tank 4 through pipeline 44 and be kept there for later re-use.

By the difference in weight of two water columns, the first being formed by aeration zone 3 and pipeline 41 and carrying an air-water mixture, the second consisting of the sludge separating tank 4 with the sludge return line 44 and carrying a heavier water column compared with the air-water column, a constant partial cycle is maintained, which leads from the aeration basin 3 via line 41 into the sludge separating tank 4, and further via the sludge return line 44 back into the aeration basin 3. This difference in the water columns creates a hydrostatic pressure at the funnel tip of the sludge separating tank 4 and returns the sludge washed into 4 immediately into the aeration basin 3, so that only very short residence times become necessary for sludge separation.

In addition, the plant has been designed in this manner for reasons of reaction kinetics.

In explanation, it is pointed out that the reaction between the micro-organisms and the sewage ingredients is of an auto-catalytic nature. Accordingly, in a continuous operation mixed systems are the most suitable.

Mixed systems, however, if the reaction is conducted continuously, have the disadvantage that a part of the medium intended for the reaction, in this case water, flows off unreacted, i.e. unpurified.

An intended removal of the residual remaining ingredients by the micro-organisms, however, obeys a reaction of first or higher order, which best proceeds in a tube reactor.

This tube reactor, in which an intermittent reaction takes place, is formed in the plant according to the invention by the pipeline 41 to the flow sludge separator 4 and thence through the sludge line 44 to the aeration zone 3.

This unaerated line system is at the same time a quieting zone for the micro-organisms, in which the latter can absorb, i.e. eat up, the adsorbed ingredients. The micro-organisms are then available in a fresh state as unburdened activated sludge for the adsorption of new ingredients in the aeration zone.

By a different layout of the pipes 41 and 44 from that shown in the figures, it is possible to obtain a direction of flow in the aeration zone 3 extending vertically downward counter to the direction of the rising air bubbles. In this embodiment the pipe 44 terminates freely as a short piece of pipe in the upper aeration zone. The pipe opening is protected by a shield against the entering of rising air bubbles. The pipe 41 ends in the lower aeration zone with upwardly directed aperture. The utilization of the oxygen content of the air introduced into the aeration zone 3 is considerably increased in that the air bubbles rise counter to the direction of flow prevailing in the aeration zone.

Via an outlet 45 and discharge pipe 451, purified water is carried away in the same quantity as untreated water is supplied to the settling basin 2 by the pump 12 via the pipeline 13. By the operation of the shut-off device 452 floating sludge to be discarded can be conveyed into the pump sump 1 via the pipeline 453.

The aeration of the reaction zone 3 can be effected, for example, by means of a compressor 5 connected with an air chamber 51. The use of an air chamber or of two blowers with pole reversible motor permits running a timed economy program by means of time switch elements.

In addition the waste heat of the air-producing units is advantageously used for heating the sewage in the biological state or stages, thus providing optimum temperature for the activity of the activated sludge, whereby a substantially improved purfication output is attained and the disadvantageous effect of a low temperature in the winter is avoided.

The air introduced to the aeration zone of tower 3, for example, by the compressor 5 via the air chamber 51 and the lines 52 and 521 or 522 into the air zone 32 through the sinter plate 31 or through line 523 directly into aeration zone 3 is discharged through the pipeline 34. The discharged air can be made use of for the pre-aeration of the untreated water.

The tower 2 also can be aerated via the pipeline 525 with a discharge of the air occuring via the pipeline 526 into the air zone 32.

Because of the enclosed state of the aeration zone 3 and the resulting low heat loss, the sewage to be purified can be brought to a temperature favorable for an optimum physiological output of the activated sludge by the dissipative heat of the compressor units 5 with favorable effect on the purification action especially in the winter.

The plant part 2 and 21 may also be designed as flat basins in the form of a single and/or multi-chamber pit above and/or below the surface of the earth. Alternatively the plant parts 3 and 4 may be operated without a preceding mechanical purification 2 and/or septic zone 21. However, in this case a sand trap is advisable, to remove mineral components of high specific gravity from the sewage.

Such a sand trap is designed, as illustrated in FIG. 2, preferably as deep sand trap and, in contrast to the conventional sand traps, is arranged above the surface of the earth. It may consist, for example, of two pipes 101 and 105 of different diameters, of which the larger embraces the smaller. The pipe of smaller diameter 101 carries the sand-water mixture directly in the direction of the sand zone 102, while the water freed from the sand is supplied to the pipe of larger diameter 105 and thus to the biological stage or stages in a vertically rising direction of flow.

The removal of the sand present in the sand zone 102 occurs by hydrostatic pressure on opening the shut-off device 103 with the sand leaving the sand trap in a vertically descending direction at the lowest point of the unit in contrast to the conventional deep sand traps, in which the sand must travel upwardly through a pipeline through the entire structure in order to be removed from it.

To avoid sedimentation of organically putrefiable substances, the sand zone 102 can be aerated via a pipeline 104 to wash out organic sedimentation substances upward.

The draining of excess sludge from the aeration basin 3 can occur via line 23 connecting branch line 231 and the shut-off device 232. If the height of the mechanical prepurification lies lower, the draining of excess sludge may occur via pipe connection 33, which is provided with a shut-off device 331. The excess sludge may be drained into sufficiently large tanks and there mineralized with the use of the air discharged through the pipeline 34 from the aeration chamber 3 by so-called sludge stabilization.

What is claimed is:

1. Method for the purification of sewage comprising the steps of: (a) introducing sewage under pressure into a settling basin, (b) allowing sand and settling substances to separate out from and clarify the sewage by gravity flow, (c) removing said separated-out substances from the bottom of said settling basin, (d) passing said clarified sewage from the top of said settling basin into the bottom of a biological purification tower, (e) subjecting said clarified sewage to aeration as it flows upward in said tower, whereby an air-water mixture is formed, (f) passing said aerated sewage from said tower into a sludge separating tank, (g) allowing sludge to separate from said aerated sewage by gravity flow, (h) returning by hydrostatic pressure said separated sludge to the bottom of said purification tower for further aeration, the difference in weight between the air-water mixture of step (e) and the water in said sludge-separating tank of step (f) causing a constant partial cycle between said aeration tower in step (e) and said sludge-separating tank in step (f), and (i) removing purified water from the top of said sludge separating tank.

2. The method of claim 1 wherein said aerated sewage moves through a quiet zone in passing from said tower into said sludge separating tank.

3. The method of claim 1 wherein said separated sludge returned to said tower is selected from various levels of said separating tank.

4. An apparatus for purification of sewage comprising a first basin having a bottom outlet, a top outlet, and at least one intermediate inlet, means for force flowing of sewage into said basin through said inlet, a second basin having a bottom outlet, at least one top outlet, an intermediate outlet, and an inlet and a return inlet, each located just above said bottom outlet, means connecting said first basin top outlet and said second basin inlet for conveying overflow sewage from said first basin, means for introducing air into the bottom of said second basin to aerate said sewage, said air exiting through said top outlet, a third basin having a top inlet, a top outlet and a bottom outlet, means for connecting said third basin top inlet with said second basing intermediate outlet for conveying aerated sewage to said third basin, means connecting said third basin bottom outlet with said second basin return inlet for returning separated sludge from said third basin to said second basin, said intermediate outlet of said second basin being located therein between said bottom outlet of said third basin and said return inlet of said second besin to circulate sewage by hydrostatic pressure between said second and said third basin, and means connecting to said third basin top outlet for conveying purified water away from said third basin.

5. The apparatus of claim 4 wherein control means are associated with each of said means connecting inlets and outlets for controlling the flow of said sewage.

6. The apparatus of claim 4 wherein means are associated with said third basin bottom outlet for returning said separated sludge from different levels within said third basin.

7. The apparatus of claim 4 wherein said first basin is hermetically sealed.

8. The apparatus of claim 4 wherein said air introducing means comprises a perforated plate spaced above the bottom of said second basin and below said inlet and return inlet and forming an air chamber, means connecting said air chamber with an air reservoir tank, and means connecting said air reservoir tank with air supplying means.

9. The apparatus of claim 8 wherein the bottom portion of said first basin is a septic tank.

10. An apparatus for purification of sewage comprising a first basin having a bottom outlet, a top outlet, and at least one intermediate inlet, means for force flowing of sewage into said basin through said inlet, a second basin having a bottom outlet, at least one top outlet, an intermediate outlet, and an inlet and a return inlet, each located just above said bottom outlet, means connecting said first basin top outlet and said second basin inlet for conveying overflow sewage from said first basin, means for introducing air into the bottom of said second basin to aerate said sewage, said air exiting through said top outlet, said air introducing means comprising a perforated plate spaced above the bottom of said second basin and below said inlet and return inlet and forming an air chamber, means connecting said air chamber with an air reservoir tank, and means connecting said air reservoir tank with air supply means, a third basin having a top inlet, a top outlet and a bottom outlet, means for connecting said third basin top inlet with said second basin intermediate outlet for conveying aerated sewage to said third basin, means connecting said third basin bottom outlet with said second basin return inlet for returning separated sludge from said third basin to said second basin, first pipe means connecting the top of said first basin to said air reservoir and second pipe means connecting the top of said first basin to said air chamber for discharging air from the top of said first basin into said air chamber, and means connecting to said third basin top outlet for conveying purified water away from said third basin.

11. An apparatus for purification of sewage comprising a first basin having a bottom outlet, a top outlet, and at least one intermediate inlet, means for force flowing of sewage into said basin through said inlet, a second basin having a bottom outlet, at least one top outlet, an intermediate outlet, and an inlet and a return inlet, each located just above said bottom outlet, means connecting said first basin top outlet and said second basin inlet for conveying overflow sewage from said first basin, means for introducing air into the bottom of said second basin to aerate said sewage, said air exiting through said top outlet, a third basin having a top inlet, a top outlet and a bottom outlet, said third basin being partially enclosed by a perforated plate, and said third basin top inlet being provided with a deaeration connection and a float, means for connecting said third basin top inlet with said second basin intermediate outlet for conveying aerated sewage to said third basin, means connecting said third basin bottom outlet with said second basin return inlet for returning separated sludge from said third basin to said second basin, and means connecting to said third basin top outlet for conveying purified water away from said third basin.

12. Method for the purification of sewage comprising the steps of: (a) introducing sewage under pressure into a settling basin, (b) allowing sand and settling substances to separate out from and clarify the sewage by gravity flow, (c) removing said separated-out substances from the bottom of said settling basin, (d) passing said clarified sewage from the top of said settling basin into the bottom of a biological purification tower, (e) subjecting said clarified sewage to aeration as it slows upward in said tower, (f) passing said aerated sewage from said tower into a sludge separating tank, (g) allowing sludge to separate from said aerated sewage by gravity flow, (h) returning by hydrostatic pressure said separated sludge to the bottom of said purification tower for further aeration, (i) removing purified water from the top of said sludge separating tank, and (j) introducing air into the bottom of said sludge-separating tank in a direction which is opposite to the flow of said separated sludge from step (h) and subjecting said sludge to aerobic treatment prior to removal from said sludge-separating tank.

13. The method of claim 12 wherein said sewage is subjected to pre-aeration prior to passing into said purification tower.

References Cited

UNITED STATES PATENTS

| | | | |
|---|---|---|---|
| 1,139,024 | 5/1915 | Frank | 210—7 |
| 3,054,602 | 9/1962 | Proudman | 210—221 X |
| 3,168,465 | 2/1965 | Kraus et al. | 210—7 |
| 3,220,706 | 11/1965 | Valdespino | 210—15 X |
| 3,232,434 | 2/1966 | Albersmeyer | 210—7 X |
| 1,893,623 | 1/1933 | Imhoff | 210—195 |

MICHAEL E. ROGERS, Primary Examiner

U.S. Cl. X.R.

210—197, 220, 261, 532